US008843943B2

(12) United States Patent
Brown

(10) Patent No.: US 8,843,943 B2
(45) Date of Patent: Sep. 23, 2014

(54) GENERATING A SERVICE DEFINITION IN VIEW OF SERVICE ACTIVITY EVENTS

(75) Inventor: Gary Peter Brown, Hitchin (GB)

(73) Assignee: Red Hat, Inc., Raleigh, NC (US)

(*) Notice: Subject to any disclaimer, the term of this patent is extended or adjusted under 35 U.S.C. 154(b) by 220 days.

(21) Appl. No.: 13/453,076

(22) Filed: Apr. 23, 2012

(65) Prior Publication Data
US 2013/0283296 A1    Oct. 24, 2013

(51) Int. Cl.
*G06F 13/00*    (2006.01)
(52) U.S. Cl.
USPC ............................ 719/318; 719/313; 719/314
(58) Field of Classification Search
CPC ............ G06F 9/54; G06F 9/542; G06F 9/546
See application file for complete search history.

(56) References Cited

U.S. PATENT DOCUMENTS

| 2002/0143920 A1* | 10/2002 | Dev et al. ..................... 709/223 |
| 2004/0260602 A1* | 12/2004 | Nakaminami et al. .......... 705/11 |
| 2010/0088384 A1 | 4/2010 | Wilkinson et al. |
| 2011/0179046 A1 | 7/2011 | Paull et al. |
| 2013/0007767 A1* | 1/2013 | Leming et al. ................ 719/314 |

OTHER PUBLICATIONS

Alalfi, Manar et al. "Automated Reverse Engineering of UML Sequence Diagrams for Dynamic Web Applications." International Conference on Software Testing, Denver, Colorado—USA Apr. 4, 2009. 30 Pages.
Tribastone, Mirco et al. "Automatic translation of UML sequence diagrams into PEPA models.". In 5th International Conference on the Quantitative Evaluation of Systems (QEST 2008), pp. 205-214, St Malo, France, 2008. IEEE Computer Society Press. (PDF, 311224 bytes).
JBoss "Savara—Project Charter", Version 1.0, Aug. 18, 2009, 21 Pages.

* cited by examiner

*Primary Examiner* — Andy Ho
(74) *Attorney, Agent, or Firm* — Lowenstein Sandler LLP

(57) ABSTRACT

A method and system for generating a set of service definitions relating to a computer application based on a set of activity events associated with a service. Based on an examination of an existing service of interest, a set of activity traces is extracted from the set of activity events and common activity events in each activity trace are identified. The common activity events are transformed into service actions and a service definition is generated including the service actions. The generated service definition may then be deployed on a suitable computing system, such as, for example, a Service Oriented Architecture (SOA) platform.

23 Claims, 4 Drawing Sheets

US 8,843,943 B2

GENERATING A SERVICE DEFINITION IN VIEW OF SERVICE ACTIVITY EVENTS

TECHNICAL FIELD

Embodiments of the present invention relate to enterprise computing systems, and more specifically, to managing and developing an enterprise computing system.

BACKGROUND

Conventional enterprise computing systems include enterprise applications designed to for large scale deployment via a Service Oriented Architecture (SOA) platform. As the complexity and scope of these enterprise applications continues to grow, it has become increasingly important to improve the manner in which the full lifecycle of the computing system is governed. For example, a user (e.g., a system integrator, developer, end-user organization) may wish to manage a project involving the maintenance or enhancement of an existing computing system. To do so, the user may need a description of the behavior of the services within the existing system.

Having an accurate description of each service's behavior enables the user to evaluate the changes required for a new version of the system relative to the existing system. Evaluating the relative changes further allows the user to assess the impact of those changes and identify any backward compatibility issues. This information may be used to estimate the development effort required for the implementation of a new system and assist the user in planning the rollout of a new system in a manner which minimizes a negative impact (e.g., loss of service) to existing users.

However, it is common for documentation relating to the operation and functionality of a service to be either non-existent or out of date. In the absence of such documentation, the user may inspect the service itself (i.e., the service's implementation code) to determine the behavior of the services. Furthermore, inspection of the service's implementation code can be time consuming and inefficient.

DETAILED DESCRIPTION

Figure 1:
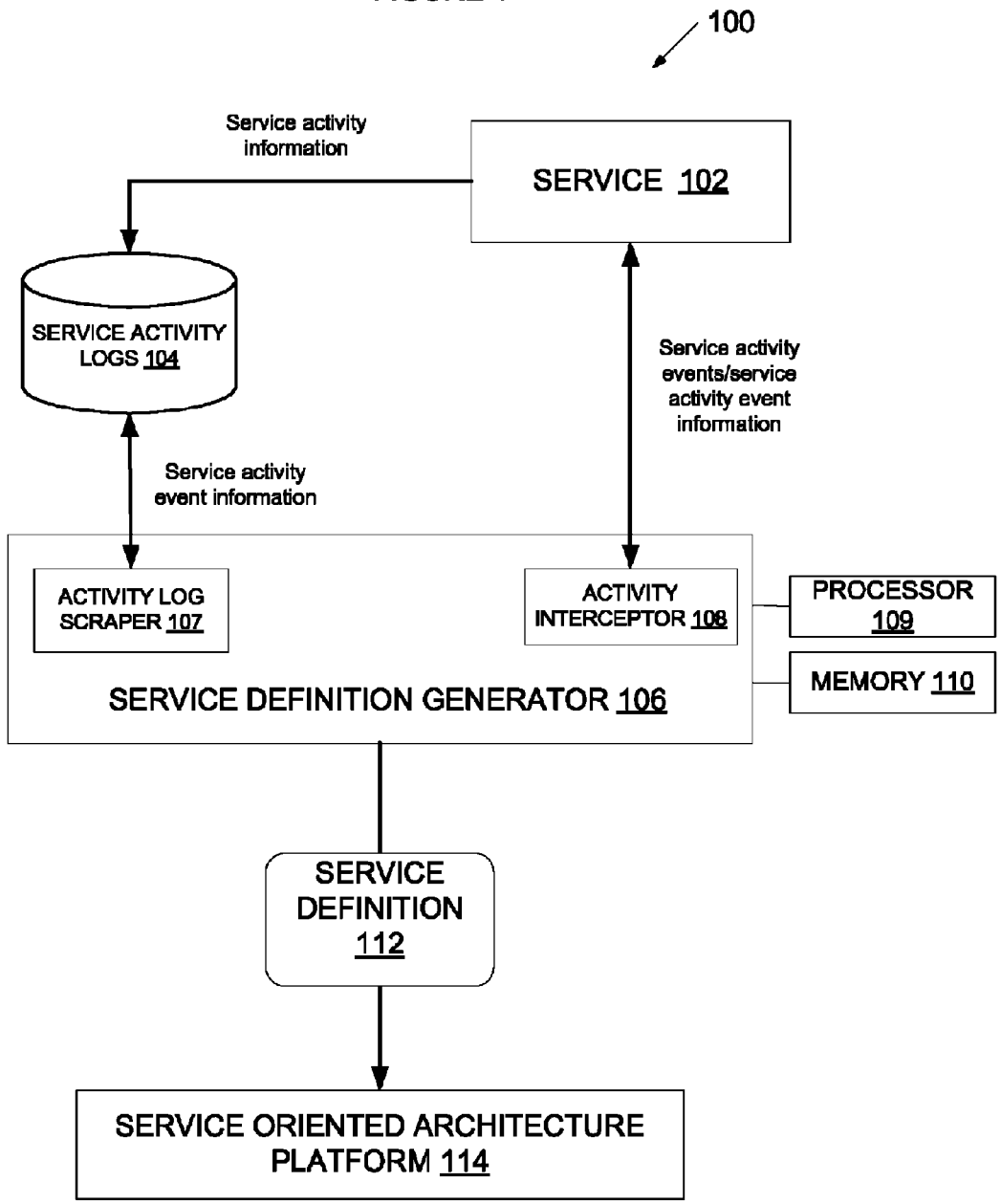
FIG. 1 is a block diagram of an exemplary computing environment including a service definition generator, according to embodiments of the invention.

Methods and systems for generating a service definition based on service activity events associated with a service. The generated service definition may be deployed in a computing system such as a Service Oriented Architecture (SOA) platform. In an embodiment, the methods and systems provide a development tool for use by a user (e.g., a system integrator or developer) in building one or more applications, particularly large scale applications, for deployment onto a SOA platform. The development tool includes a service definition generator configured to receive a set of activity events associated with an existing service. In an embodiment, the existing service may be operating in a production environment. As used herein, the term "activity event" or "service activity event" refers to any action, activity, transaction, step (including an internal step), function, etc., performed, conducted, and/or logged during execution of a service. The set or stream of service activity events are captured from a service of interest (i.e., a service for which the service definition is being generated). In an embodiment, the set of service activity events represent the execution of multiple transactions by the service, such as, for example, receiving a message, invoking another service, assigning values to a variable, evaluating an expression, writing or querying information from a database, etc. In an embodiment, the service definition may be generated based on information associated with a single service of interest (e.g., information relating to other services in the computing system may not be considered in generating the service definition for the particular service of interest).

In an embodiment, the set of activity events may be collected by monitoring, intercepting, or receiving messages exchanged by the service of interest with another participant. In an embodiment, the set of activity events may be captured by scanning one or more service activity logs associated with the service and extracting or scraping information relating to service activities (e.g., session information). In an embodiment, an activity interceptor, described in detail below, may be employed to monitor the activity of the service. The activity interceptor may be configured to observe any activity performed by the service (e.g., monitor messages as they are sent and/or received by the service and inspect the content of the messages). In an embodiment, log files (which may be stored in files or centrally in a database) including the logged activities of the service may be accessed and examined in order to monitor the activity of the service.

As used herein, the term "service definition" refers to any abstract or concrete executable representation describing the interactional behavior of a service, including the manner in which the service interacts with other participants in an overall system. Exemplary service definitions include Web Services Business Process Execution Language (WS-BPEL) representations, Business Process Model and Notation (BPMN) representations, or any suitable structured programming language (e.g., Java, Visual C#, etc.). As used herein, the term "participant" includes any entity capable of interacting with another entity within the system, such as, for example, a service, an application, an individual, a business unit, an organization, or the like.

In an embodiment, the methods and systems examine an existing service to identify service activities and generate a service definition based on the identified service activities. Advantageously, an existing service may be reverse engineered in order to develop an appropriate service definition expressing the behavior/actions of the service.

Furthermore, the methods and systems according to embodiments of the present invention may be used to develop large scale distributed computing systems including multiple co-operating participants (e.g., services) and multiple developers. By deriving the service definition from the one or more service's activity events, the methods and systems according to embodiments of the present invention ensure that the generated service definition model the service's behavior as exhibited in an actual production environment. The generated service definition including a stateful representation of the service may be registered against the service implementation in a service registry. Advantageously, registering a stateful representation of the service via the service registry allows a user (e.g., a client) to confirm that the user's intended use of the service (e.g., the planned service implementation) is compatible with the manner in which the service operates (e.g., the order in which operations are performed). In this regard, the client may ensure that the appropriate service is being used based on confirming that the behavior of the service is compatible with the client's desired behavior.

In an embodiment, once the service definition is generated, static validation may be performed against the intended service implementation to ensure that planned or anticipated changes to the service implementation comply with the service definition. In addition, the generated service definition may be used to determine the service's compatibility for use within a choreography or for interacting with other services (where service definitions for those services are available).

FIG. 1 is a block diagram of an exemplary computing environment 100 according to embodiments of the invention. The computing environment 100 includes a service 102 configured to perform a set (or stream) of service activities. The set of service activities and/or information associated with the set of service activities are captured by a service definition generator 106.

In an embodiment, the service definition generator 106 is a software component (e.g., a set of instructions residing in memory 110) executable by a processing device (e.g., processor 108) which provides a tool for the development of one or more service definitions and performance of the functionality described in detail below. In an embodiment, the service definition generator 106 is configured to generate one or more service definitions 112 based on the set of service activities performed by the service 102. In an embodiment, the service 102 and the service definition generator 106 may reside on the same computing device or be communicatively connected to one another via a network (not shown).

In an embodiment, the service definition generator 106 may be hosted by a computing device (e.g., a server). The computing device may include, for example, a desktop computer, a portable digital assistant, a mobile phone, a laptop computer, a portable media player, a tablet computer, a netbook, a notebook, or a personal computer. In an embodiment, the computing device may further include a user interface configured to allow a user (e.g., a system integrator) access to the service definition generator 106. In an embodiment, the user may access the service definition generator 106 using a user device (not shown) via a network (not shown), such as, for example, a public network such as the Internet, a private network such as a local area network (LAN), or a virtual private network (VPN)).

In an embodiment, the service definition generator 106 includes an activity log scraper 107 configured to collect, receive, capture, retrieve, extract and/or scrape service activity information from one or more service activity logs 104 associated with the service 102. The service activity logs 104 may be maintained in any suitable fashion. For example, the service activity logs 104 may be stored locally to where the service 102 is executing, may be centrally recorded in a database, or may be uploaded to a central server. In an embodiment, the service activity logs 104 may be created based on the instrumentation of the service 102, and may be configured to capture various activities that occur either sequentially or concurrently. In an embodiment, the entries in the service activity logs 104 may be recorded locally in a file so they are available for debugging purpose. In an embodiment, the service activity logs 104 may be in any suitable format, such as, for example, text based logs or in XML format. In an embodiment, the service definition generator 106 may be configured to receive activity events scraped from the text and/or XML messages maintained in the service activity logs 104.

The service activity event information may include any information describing, identifying, or relating to one or more service activity events performed by the service 102, such as, for example, a service's internal identifier, a session identifier, a process identifier, a correlation identifier (e.g., an identifier associated with a standard such as WS-CDL, WS-BPEL, BPMN2). In an embodiment, the service activity information may include message contents, a variable name and the content being assigned to the variable, an expression evaluation result, etc. In some cases, the service activity information being scraped is available in well-defined fields in the recorded service activity logs, such as, if the logs are in XML format. In an embodiment, regular expressions may be used to extract relevant service activity information from the service activity logs. In an embodiment, the activity log scraper 107 is a software component of the service definition generator 106 including a set of instructions configured to collect service activity event information from the service activity logs 104 for use by the service definition generator 106 in generating the service definition. In an embodiment, the activity log scraper 107 may be a standalone component configured to communicate with the service definition generator 106.

In an embodiment, the service definition generator 106 includes an activity interceptor 108 configured to collect or intercept service activity event information or monitor the actual service activity events performed by the service 102. In an embodiment, the service activity event information may be inferred from information contained in the messages being sent and/or received by the service. For example, the service activity event information that may be inferred from message content includes a message type, the actual message content, business identifiers, etc. In an embodiment, the activity interceptor 108 may be a component of the service definition generator 106 (as shown in FIG. 1) or a component of the service 102.

In an embodiment, the processor 109 and memory 110 may be the local processing device and memory of the service definition generator 106. In another embodiment, the service definition generator 106 may be installed on a computing device (e.g., a user device) from any suitable non-transitory computer-readable storage medium or via network (e.g., by a download). It is noted that any suitable arrangement may be employed such that the service definition generator 106 may perform the functions described in detail below in connection with FIGS. 2 and 3.

As shown in FIG. 1, the service definition generator 106 is configured to receive a set of activity events from a service of interest 102 (i.e., the service for which the service definition is being generated) and generate a service definition 112 for deployment on a computing system, such as, for example, a Service Oriented Architecture (SOA) platform 114. For example, a cluster of servers may be employed to run a distributed SOA platform.

Figure 2:
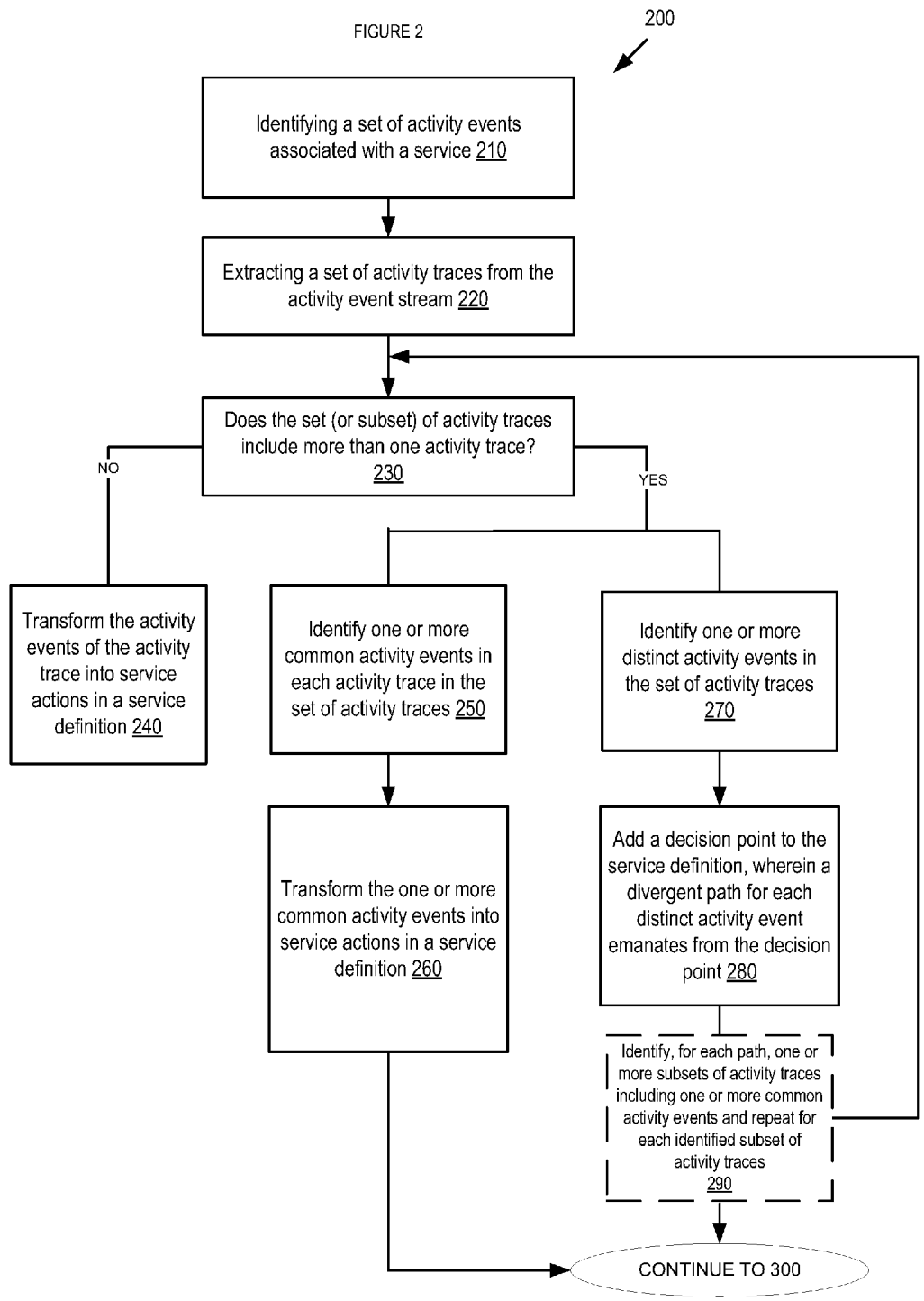
FIG. 2 is a flow diagram of exemplary methods for generating a service definition, according to embodiments of the present invention.

FIG. 2 is a flow diagram of one embodiment of a method 200 for generating a service definition based on a set of service activity events. The method is performed by processing logic that may comprise hardware (circuitry, dedicated logic, etc.), software (such as is run on a general purpose computer system or a dedicated machine), or a combination of both. In one embodiment, the method is performed by a processing device configured to execute a service definition generator (e.g., the service definition generator 106 of FIG. 1).

In an embodiment, the set of activity events include a representation of a sequence of transactions, actions or activities performed by a service of interest. Referring to FIG. 2, in block 210, the service definition generator identifies the set of service activity events associated with the service of interest (e.g., from a service activity log and/or from the service itself). In an embodiment, the set of activity events (e.g., the source information upon which the service definition is generated) is identified based on extracting the service activity event information from a service activity log. In another embodiment, the set of service activity events is identified by monitoring the one or more messages sent and/or received by the service of interest.

In block 220, the set of service activities are examined and a set of activity traces for the service is isolated or extracted from the set of activity events. An activity trace represents the inbound (received) message event, variable assignments, database read/write, condition evaluation, outbound (sent) message event, etc. that occur within the scope of a particular transaction executed by the service. An exemplary activity trace may include the receipt of a credit check request, the query of a database to read a customer record, the evaluation of a condition based on the requested credit against the customer record, and the sending of a result of the evaluation.

In block 230, it is determined whether the set of activity traces includes a single activity trace or multiple activity traces. If, in block 230, it is determined that the set of activity traces includes a single activity trace, then the activity events of the single activity trace are transformed into service actions (i.e., an action performed by the service as part of the service definition) and added to a service definition, in block 240. For example, an outbound message event may be transformed into a 'send message' service action, an assignment may be transformed into an 'assignment' action, and an inbound message event may be transformed into a 'receive message' service action.

In block 230, if it is determined that the set of activity traces includes more than one activity trace, then one or more common activity events found in all of the activity traces in the set of activity traces are identified, in block 250. The identified common activity events found in each of the activity traces are then transformed into service actions and added to the service definition, in block 260. In an embodiment, a common activity trace may be identified when two or more activity traces have a common event, e.g., two activity traces have a "receive credit check" message followed by a "read customer record from the database" message.

In block 270, one or more distinct activity events are identified in the set of activity traces (e.g., a different send activity event or a different receive activity event in at least one of the activity traces in the set of activity traces). The distinct activity events represent a divergence in the behavior of the service and results in the creation of a "decision point" for inclusion in the service definition, in block 280. A path for each distinct activity event emanates from the decision point (e.g., each distinct activity event results in a new path emanating from the decision point). As such, the number of paths emanating from the decision point is based on the number of distinct activity events across all of the activity traces in the set of activity traces.

In an embodiment, a subset of activity traces is identified including multiple activity traces which share the same activity event, in block 290. For each identified subset of activity traces, the actions in blocks 230-280 may be performed until all of the subsets of activity traces have been processed. Advantageously, the optional iterative processing of the subsets of activity traces (the optional nature is denoted by dashed lines in FIG. 2) provides for the further identification of service actions for inclusion in the service definition such that patterns and commonalities in the actions and behavior of the participant in the multiple decision point paths may be identified and integrated into the generated service definition.

Figure 3:
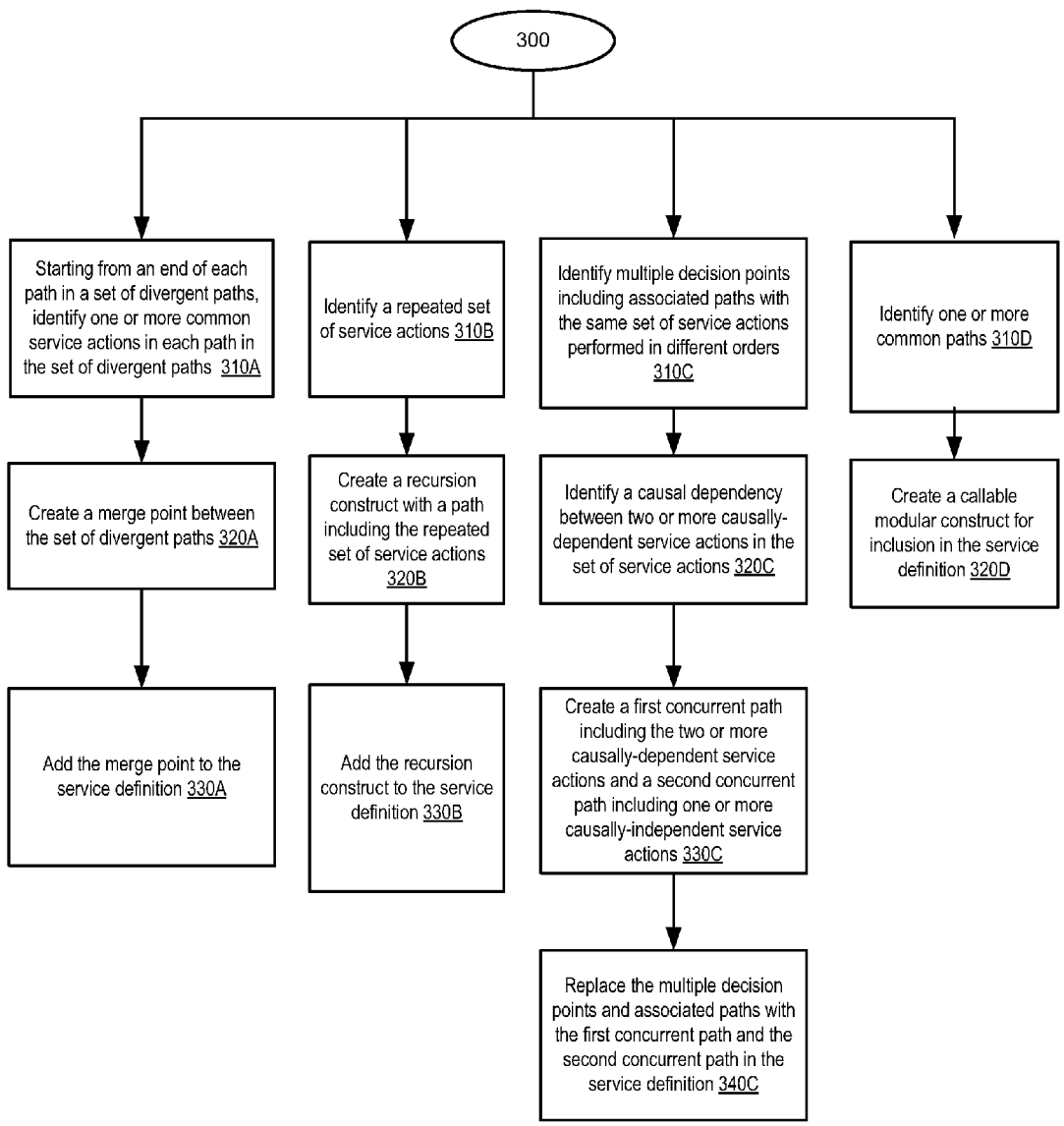
FIG. 3 is a flow diagram of exemplary methods for generating a service definition, according to embodiments of the present invention.

In an embodiment, following the generation of a service definition in block 260 and/or block 290, method 300 may be performed in order to simplify the generated service definition through the identification of behavioral patterns, as shown in FIG. 3. In an embodiment, a set of divergent paths emanating from a particular decision point may be examined to identify one or more common service actions found in each path, in block 310A. In an embodiment, starting from the end of each path in the set of divergent paths, one or more common service actions are identified. Upon the identification of common service actions across the set of divergent paths, a merge point (e.g., a point of convergence of the paths) is created between the set of divergent paths and the common service actions are placed after the merge point, in block 320A. The merge point is then added to the service definition, in block 330A. The addition of the merge point to the service definition ensures that only the service actions that represent different behavior between the paths are described in the separate/distinct paths. In an embodiment, the identification of merge points and inclusion in the service definition in blocks 310A-330A may be performed recursively. In this embodiment, when a difference between service actions is identified at an end of the paths, the subsets of paths could be further considered, wherein the paths in the subsets of paths have a common end service action. The paths can be further recursively processed to create further merge points until only one path exists in the subset of paths and no further merge points can be generated.

In an embodiment, if the set of interaction models represent a set of use cases that reflect a repeated set of service actions, a hierarchy of decision points is produced in accordance with method 200. In an embodiment, the hierarchy of decision points may be examined and a repeated set of service actions found in a path emanating from each decision point may be identified, in block 310B. In block 320B, a recursion construct including the repeated set of service actions is created to replace the multiple instances of the repeated set of service actions. For example, the recursion construct may include a 'for' loop, wherein a condition is evaluated and, if 'true', the service actions defined within the loop are performed before re-evaluating the condition. In this example, when the condition is 'false', the loop is skipped. In block 330B, the recursion construct is added to the service definition.

In an embodiment, each decision point is examined to determine if the same service actions are found in all of the paths, but in different orders of execution. In block 310C, the multiple decision points including paths with the same set of service actions performed in different orders are identified. Such instances are indicative of situations wherein some or all of the service actions can be performed concurrently. In block 320C, one or more causal dependencies between service actions in the aforementioned set of service actions are identified. Two or more service actions having a causal relationship are referred to herein as "causally-dependent service actions". For example, assume the identification of the following three decision paths: ABC (e.g., wherein service action A is performed first, service action B is performed second, and service action C is performed third); ACB (e.g., wherein service action A is performed first, service action C is performed second, and service action B is performed third); and CAB (e.g., wherein service action C is performed first, service action A is performed second, and service action B is performed third). Based on an examination of the three paths, a causal dependency is identified between service action A and service action B (e.g., service action A and service action B are causally-dependent service actions), but service action C has no dependency on either service action A or service action B (i.e., service action C is a causally-independent service action).

In block 330C, a concurrent path is created for each set of causally-dependent service actions and a separate concurrent path is created to include the causally-independent service action(s). In the example described above, a first concurrent path is created which includes service actions A and B and a second concurrent path is created which includes service action C. In block 340C, the multiple decision points and associated paths are replaced by the created concurrent paths and added to the service definition.

In an embodiment, common sub-groups of service actions may be identified, in block 310D. In such cases, reusable and callable modular construct (e.g., like a callable function) are created for the common sub-groups and added to the service definition, in block 320D. In an embodiment, a pointer or other reference representing the callable modular construct may be added to the original location in the service definition.

It is noted that the various approaches for refinement of the generated service definitions (e.g., 310A-330A; 310B-330B; 310C-340C; and 310D-320D) may be performed individually or in combination with one another. In this regard, any or all of the refinement options illustrated in FIG. 3 and described above may be performed to further refine a service definition generated in accordance with embodiments of the present invention, such as a service definition generated in accordance with method 200.

Figure 4:
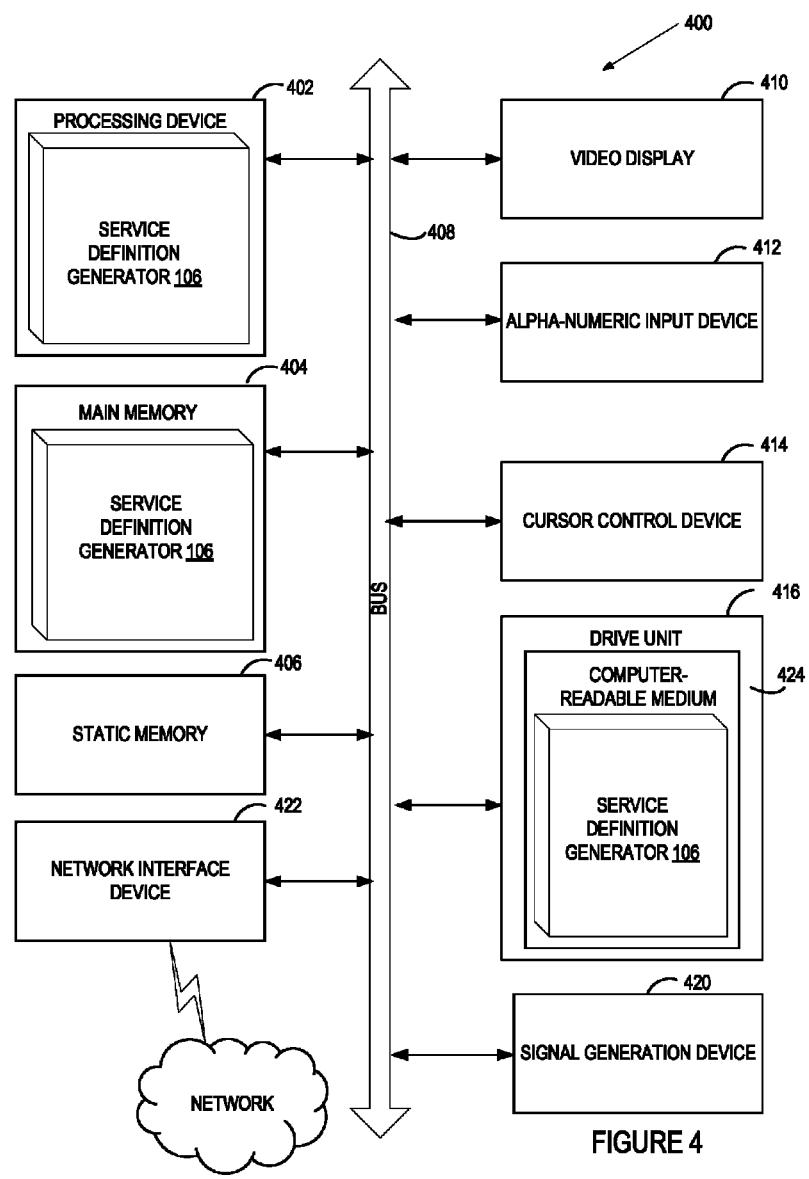
FIG. 4 illustrates an exemplary service definition generation system, according to an embodiment of the present invention.

FIG. 4 illustrates an exemplary service definition generation system 400 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary service definition generation system 400 includes a processing device (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The service definition generator 106 in FIG. 1 may comprise processing device 402 configured to perform the operations and steps discussed herein.

The service definition generation system 400 may further include a network interface device 422. The service definition generation system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

A drive unit 416 may include a computer-readable medium 424 on which is stored one or more sets of instructions (e.g., instructions of the service definition generator 106) embodying any one or more of the methodologies or functions described herein. The instructions of the service definition generator 106 may also reside, completely or at least partially, within the main memory 404 and/or within the processing device 402 during execution thereof by the service definition generation system 400, the main memory 404 and the service definition generator 106 also constituting computer-readable media. The instructions of the service definition generator 106 may further be transmitted or received over a network via the network interface device 422. In an embodiment, the service definition generator 106 may be installed on (i.e., via a download or via a computer-readable storage medium) a computing device (e.g., a user computer or a server) for execution on the user device. In an embodiment, the user device may include the various components illustrated in FIG. 4.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "extracting", "transforming", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying a set of activity events associated with a service;
   extracting a set of activity traces from the set of activity events;
   identifying a common activity event in each activity trace of the set of activity traces;
   transforming the common activity event into a service action;
   generating, by a processing device, a service definition comprising the service action;
   identifying a distinct activity event in the set of activity traces; and
   adding a decision point to the service definition, wherein the decision point comprises a path for the distinct activity event.

2. The method of claim 1 further comprising identifying, for the path, a subset of activity traces sharing a common activity event.

3. The method of claim 2 further comprising:
   identifying an additional common activity event in the subset of activity traces;
   transforming the additional common activity event into an additional service action; and
   adding the additional service action to the service definition.

4. The method of claim 1 further comprising:
   identifying a set of divergent paths emanating from a particular decision point in the service definition;
   identifying an additional common service action at an end of each path in the set of divergent paths;
   creating a merge point between the set of divergent paths, wherein the additional common service action emanates from the merge point; and
   adding the merge point to the service definition.

5. The method of claim 1 further comprising:
   identifying a repeated set of service actions in the service definition;
   creating a recursion construct, wherein a recursion path comprising the repeated set of service actions emanates from the recursion construct; and
   adding the recursion construct and the recursion path to the service definition.

6. The method of claim 1 further comprising:
   identifying a plurality of decision points comprising a common set of service actions performed in different orders in the service definition;
   identifying a causal dependency between a set of service actions in the common set of service actions;
   creating a concurrent path for the set of causally-dependent service actions and an additional concurrent path for each causally-independent service action; and
   replacing the plurality of decision points with the concurrent path and the additional concurrent path in the service definition.

7. The method of claim 1 further comprising:
   identifying a common path in the service definition;
   creating a callable modular construct for the common path; and
   replacing the common path with the callable modular construct in the service definition.

8. The method of claim 1, wherein the set of activity events associated with the service is identified in view of service activity information logged during execution of the service.

9. The method of claim 1, wherein the set of activity events associated with the service is identified in view of service activity information received from the service by monitoring a message sent or received by the service.

10. A non-transitory computer-readable storage medium including instructions that, when executed by a processing device, cause the processing device to perform operations comprising:
   receiving a set of activity events associated with a service;
   extracting a set of activity traces from the set of activity events;
   identifying a common activity event in each activity trace of the set of activity traces;
   transforming the common activity event into a service action;
   generating, by the processor, a service definition comprising the service action;
   identifying a distinct activity event in the set of activity traces; and adding a decision point to the service definition, wherein the decision point comprises a path for the distinct activity event.

11. The non-transitory computer-readable storage medium of claim 10 further comprising identifying, for the path, a subset of activity traces sharing a common activity event.

12. The non-transitory computer-readable storage medium of claim 11 further comprising:
identifying an additional common activity event in the subset of activity traces;
transforming the additional common activity event into an additional service action; and
adding the additional service action to the service definition.

13. The non-transitory computer-readable storage medium of claim 10 further comprising:
identifying a set of divergent paths emanating from a particular decision point in the service definition;
identifying an additional common service action at an end of each path in the set of divergent paths;
creating a merge point between the set of divergent paths, wherein the additional common service action emanates from the merge point; and
adding the merge point to the service definition.

14. The non-transitory computer-readable storage medium of claim 10 further comprising:
identifying a repeated set of service actions in the service definition;
creating a recursion construct, wherein a recursion path comprising the repeated set of service actions emanates from the recursion construct; and
adding the recursion construct and the recursion path to the service definition.

15. The non-transitory computer-readable storage medium of claim 10 further comprising:
identifying a plurality of decision points comprising a common set of service actions performed in different orders in the service definition;
identifying a causal dependency between a set of service actions in the common set of service actions;
creating a concurrent path for the set of causally-dependent service actions and an additional concurrent path for each causally-independent service action; and
replacing the plurality of decision points with the concurrent path and the additional concurrent path in the service definition.

16. The non-transitory computer-readable storage medium of claim 10 further comprising:
identifying a common path in the service definition;
creating a callable modular construct for the common path; and
replacing the common path with the callable modular construct in the service definition.

17. A system comprising:
a memory; and
a processing device, coupled to the memory the processing device, to:
receive a set of activity events associated with a service,
extract a set of activity traces from the set of activity events,
identify a common activity event in each activity trace of the set of activity traces,
transform the common activity event into a service action,
generate a service definition comprising the one or more service actions,
identify a distinct activity event in the set of activity traces, and
add a decision point to the service definition, wherein the decision point comprises a path for the distinct activity event.

18. The system of claim 17, the processing device to identify, for the path, a subset of activity traces sharing a common activity event.

19. The system of claim 18, the processing device to:
identify an additional common activity event in the subset of activity traces,
transform the additional common activity event into an additional service action, and
add the additional service action to the service definition.

20. The system of claim 17, the processing device to:
identify a set of divergent paths emanating from a particular decision point in the service definition,
identify an additional common service action at an end of each path in the set of divergent paths,
create a merge point between the set of divergent paths, wherein the additional common service action emanates from the merge point, and
add the merge point to the service definition.

21. The system of claim 17, the processing device to:
identify a repeated set of service actions in the service definition,
create a recursion construct, wherein a recursion path comprising the repeated set of service actions emanates from the recursion construct, and
add the recursion construct and the recursion path to the service definition.

22. The system of claim 17, the processing device to:
identify a plurality of decision points comprising a common set of service actions performed in different orders in the service definition;
identify a causal dependency between a set of service actions in the common set of service actions;
create a concurrent path for the set of causally-dependent service actions and an additional concurrent path for each causally-independent service action; and
replace the plurality of decision points with the concurrent path and the additional concurrent path in the service definition.

23. The system of claim 17, the processing device to:
identify a common path in the service definition,
create a callable modular construct for the common path, and
replace the common path with the callable modular construct in the service definition.

* * * * *